(12) United States Patent
Stoffelsma et al.

(10) Patent No.: US 7,783,516 B2
(45) Date of Patent: Aug. 24, 2010

(54) METHOD FOR AUTOMATICALLY DETERMINING A FARE FOR THE USE OF CHARGEABLE MEANS OF TRANSPORT CONVEYING PERSONS

(75) Inventors: Bouke C. Stoffelsma, Mönchengladbach (DE); Manfred Feiter, Mönchengladbach (DE)

(73) Assignee: in medias res Gesellschaft fur Kommunikationstechnologien mbH (DE)

( * ) Notice: Subject to any disclaimer, the term of this patent is extended or adjusted under 35 U.S.C. 154(b) by 185 days.

(21) Appl. No.: 11/792,176

(22) PCT Filed: Dec. 2, 2005

(86) PCT No.: PCT/EP2005/012889

§ 371 (c)(1),
(2), (4) Date: Aug. 7, 2007

(87) PCT Pub. No.: WO2006/058763

PCT Pub. Date: Jun. 8, 2006

(65) Prior Publication Data

US 2008/0228586 A1 Sep. 18, 2008

(30) Foreign Application Priority Data

Dec. 2, 2004 (DE) .................. 10 2004 058 273
Dec. 2, 2004 (EP) .................. 04028569
Dec. 16, 2004 (DE) .................. 10 2004 061 180

(51) Int. Cl.
*G06Q 20/00* (2006.01)
*G06Q 40/00* (2006.01)
*H04B 1/02* (2006.01)
*G07B 16/00* (2006.01)

(52) U.S. Cl. .................. 705/17; 705/13; 705/35; 340/5.64

(58) Field of Classification Search ............ 705/35
See application file for complete search history.

(56) References Cited

U.S. PATENT DOCUMENTS

| 6,595,416 | B1 * | 7/2003 | Newsome et al. ............ 235/381 |
| 6,888,443 | B2 * | 5/2005 | Ritter ........................ 340/5.64 |
| 2003/0036355 | A1 | 2/2003 | Gundlach |
| 2003/0120567 | A1 * | 6/2003 | Macklin ...................... 705/35 |
| 2003/0164399 | A1 | 9/2003 | Harris |
| 2004/0006512 | A1 | 1/2004 | Rebsamen |
| 2004/0015475 | A1 | 1/2004 | Scheepsma |
| 2004/0153406 | A1 | 8/2004 | Alarcon-Luther et al. |

FOREIGN PATENT DOCUMENTS

| DE | 199 57 660 A1 | 7/2000 |
| EP | 0 380 377 A1 | 8/1990 |
| EP | 1 304 670 A1 | 4/2003 |
| WO | WO-01/69540 A1 | 9/2001 |
| WO | WO-02/056237 A2 | 7/2002 |
| WO | WO-02/095540 A2 | 11/2002 |

OTHER PUBLICATIONS

International Search Report for PCT/EP2005/012889 dated Mar. 22, 2006 (in German and English).

* cited by examiner

*Primary Examiner*—F. Ryan Zeender
*Assistant Examiner*—Denisse Ortiz Roman
(74) *Attorney, Agent, or Firm*—Harness, Dickey & Pierce, P.L.C.

(57) ABSTRACT

Disclosed is a method for automatically determining a fare for utilizing chargeable means of transport conveying persons. According to said method, a credit which is established in a currency that is valid in a first currency zone and is used for automatically deducting the fare when utilizing a means of transport is allocated to a user terminal, a factor for converting the first currency into a second currency that is valid in a second currency zone is defined as soon as the user terminal is utilized in a second currency zone, and fares are automatically determined in the second currency, are converted into the first currency using the defined conversion factor, and are deducted from the credit established in the first currency as long as the user terminal is not utilized in another currency zone.

10 Claims, No Drawings

METHOD FOR AUTOMATICALLY DETERMINING A FARE FOR THE USE OF CHARGEABLE MEANS OF TRANSPORT CONVEYING PERSONS

The present invention relates to a method for automatically determining a fare for the use of chargeable means of transport conveying persons, in which a credit is allocated to a user terminal, which credit serves for the automatic deduction of the fare in case of a use of a means of transport.

Such methods are principally well known in the state of the art.

In Hanau the Rhein-Main-Verkehrsverbund for example operates on trial a so called "check in/check out" system, in which the passenger identifies himself by means of a chip card at a terminal in the vehicle on getting into and out of the vehicle. A background system then calculates which distances the customer has actually traveled and books the calculated fares on an account related to the chip card, via which the deduction can then be carried out.

PCT application NL01/00215 describes a method, in which the passenger uses a user terminal (for example a mobile phone or a transponder) with a number allocated to him, in order to be automatically identified when he is in a vehicle of the public short-distance traffic. The means of transport automatically registers where the passenger gets into the means of transport and where he leaves it. Usually, these data are transmitted to a background system that determines the fare for the traveled distance on the base of these data. Such a system is generally called "be-in/be-out" system.

From DE 199 57 660 a method for deducting the fare for the use of public transport means is known, in which a cheque card-like memory that is carried along by the user is charged with a credit. During the use of public transport means, the transport means emits counting pulses and for each received counting pulse a pre-determined amount is deducted from the credit that is memorized on the memory unit.

Furthermore, from Switzerland a pilot project called "easyride" is known, in which the customer carries along a transponder card which registers him in the means of transport when he uses a means of transport and which repeats this registration regularly. Based upon these registrations the travel distance as well as the fare to be paid for this travel distance can be determined and deducted.

It is an object of the present invention to provide an improved method for automatically determining a fare for the use of chargeable means of transport conveying persons.

This aim is achieved according to the present invention by a method according to claim 1. The dependent claims refer to individual embodiments of the method according to the invention.

In the method according to the invention, as in the initially mentioned known methods, a credit is allocated to a user terminal, which credit serves for the automatic deduction of the fare when a means of transport is used. Herein the credit is allocated to the user terminal in a currency that is valid in a first currency zone.

As soon as the user terminal is used in a second currency zone, a conversion factor for converting the first currency into a second currency that is valid in the second currency zone is automatically determined, wherein the conversion factor preferably remains constant during a pre-determined period of time or until a pre-determined event happens, such as the use of the user terminal in another currency zone.

Fares for the use of chargeable transport means are then principally determined in the second currency, converted into the first currency using the determined conversion factor and then deducted from the credit established in the first currency as long as the user terminal is not used in another currency zone. Thus, the credit is maintained in the first currency and is not entirely converted into the second currency by means of the conversion factor. Only the fare is calculated in the second currency, then it is converted into the first currency and deducted from the credit in the first currency. This has the advantage that no reduction of the entire credit only because of currency variations has to be feared, if a user goes from a first currency zone into a second one and then back again. Since the conversion factor remains constant during a pre-determined period of time or until a pre-determined event happens, the credit allocated to the user terminal cannot decrease during this period of time due to currency variations. Accordingly, one can for example exclude the case that the credit is still sufficient when starting the ride, but during the ride it is reduced such that at the end the demanded fare can no more deducted from the credit memorized on the user terminal.

Thus, the present invention provides a method for automatically determining a fare for the use of chargeable means of transport conveying persons that can be used in different currency zones, wherein it is assured that the user will not have any losses due currency variations. Accordingly, the user can estimate the credit allocated to the user terminal, since the credit will only change because of a use of a transport means. Finally, the user can also subsequently duplicate the deduction of single rides, since during the stay in a currency zone principally the same conversion factor will be used.

The actual credit is preferably indicated in the currency of the currency zone in which the user terminal is used. Herein, the credit can be indicated via a display of the user terminal or another device. Indicating the actual credit has the advantage that the user of the user terminal can estimate the amount of the remaining credit and verify himself whether his credit will be sufficient or not for a ride, the price of which he knows in the second currency.

In an embodiment of the method according to the invention, the credit allocated to the user terminal can be stored on the user terminal. The determination of the fare is then preferably carried out by a processing unit integrated in the user terminal.

Alternatively, the credit allocated to the user terminal can also be stored in a background system of the provider of the method, via which the fare will then be preferably determined and afterwards deducted.

The credit is advantageously stored in the currency which is valid in the currency zone in which it has been charged. If the credit is for example loaded in Germany, it will be stored in EURO, but if it is loaded in Denmark, it will be stored in Danish crowns.

It is also preferably possible to allocate several credits in several currencies to a user terminal, wherein preferably such credit is at first used up that has been charged in the currency zone in which the user terminal is actually being used. The entire credit is then indicated in the currency that is valid in the currency zone in which the user terminal is used. If for example a first EURO credit is loaded in Germany and a second credit in crowns is loaded in Denmark, for sticking to the above mentioned example, the EURO credit will be converted into crowns by means of the determined conversion factor and added to the credit in crowns, if the user terminal is used in Denmark, such that a total credit is indicated in crowns. If however the user terminal is used in Germany, the credit in crowns will be converted into EURO and added to the EURO credit on the base of a first conversion factor that has been determined during the first use in Germany, whereupon a total credit in EURO will be indicated for example on a display of the user terminal. If however the user terminal is used in Turkey, both the credit in crowns and the EURO credit will be respectively converted into a credit in Turkish pounds and then added by means of conversion factors that have been determined during a first use of the user terminal in Turkey, such that accordingly the entire credit will also be indicated in Turkish pounds. A background system can for example provide the conversion courses.

As already described above, the method according to the invention enables a use of a credit allocated to a user terminal or an electronic ticket in several currency zones. If herein the transport services of different service providers are used, it can happen that a credit is charged with a particular service provider, but the transport service of another service provider is used. In this case a corresponding (financial) compensation between the corresponding service providers has to be carried out on deduction of the transport service. However, this compensation is not the subject of the present invention such that it will not be described in further detail in the following.

It has to be understood that the method according to the invention can be integrated in every existing method for automatically detecting a fare for the use of chargeable means for transport conveying persons, such as for example in one of the initially described methods. This shall be explained in detail in the following by means of two exemplary embodiments of the method according to the invention that do not limit the scope of protection of the present invention:

In a first exemplary embodiment of the method according to the invention, a credit is memorized on a user terminal, which credit will be automatically reduced in dependence on a distance traveled in a chargeable means of transport. For this, the user terminal is adapted for receiving data telegrams emitted by transmitters arranged inside the transport means, wherein the data telegrams contain information in consideration of which the fare is determined and then automatically deducted from the credit stored on the user terminal.

The credit is memorized on the user terminal in such currency that is valid in the currency zone in which the credit has been charged, for example by using a charge device provided for this. If the credit has been for example charged in Germany, the credit will be stored in EURO. Alternatively, the credit can be for example a point system, wherein the points are charged for a certain amount of money.

According to the invention, the data telegrams emitted by the transmitters arranged in the transport means also contain currency information that comprise information about the currency in which the fare for the use of this transport means will be deducted, and which will be called valid currency in the following, as well as actual conversion factors for converting other currencies into the valid currency. These conversion factors can be official rates of exchange or rates of conversion and/or validity and/or exchange that have been freely chosen by the method provider.

If a credit of a user terminal was charged in Germany and if a user having this user terminal gets into a German means of transport, the user terminal will receive the currency information together with the data telegrams emitted by the transmitters. This currency information is processed in the user terminal, whereupon it is determined that the currency which is valid for the transport means corresponds to the currency in which the credit has been stored on the user terminal. A determination of the fare as well as the reduction of the credit stored on the user terminal that results therefrom can thus be carried out without a currency conversion having to be done.

If a user having the same user terminal for example gets into a Danish means of transport, the user terminal will determine by means of the transmitted currency information that the currency of the credit stored on it does not coincide with the currency in which a transport in the present transport means will be accounted. Thereupon, the stored credit is converted from EURO into Danish crowns with the corresponding conversion factor and is indicated on a display of the user terminal, whereupon a reduction of the credit in Danish crowns is carried out in dependence on the distance traveled in the means of transport.

During a first use of a means of transport in a currency zone that does not correspond to the currency zone in which the credit has been charged, the transmitted conversion factor will be stored in the user terminal and used until the user terminal is again used in another currency zone, i.e. during the whole stay of the user in the corresponding currency zone. In this way it is assured that the credit indicated on the display of the user terminal remains constant during the user's complete stay in a currency zone and will not be affected by a variation of the rate of exchange. This has the advantage that the user can estimate the amount of a remaining credit and can verify himself whether this one will be sufficient or not for a ride the price of which he knows. Furthermore, the user can duplicate the account of the transports he has used, since these ones are based upon a uniform conversion factor.

At this point it is to be noted that the fares are deducted in a foreign currency, but the currency of the stored credit remains constant. Thus, the fare is converted into the currency of the stored credit by means of the conversion factor and is thereupon only deducted from the stored credit. If the user returns to the currency zone in which his credit has been charged, the currency of the stored credit does not have to be converted. During the next use of a means of transport, the conversion factor will rather be corrected to the number "1", since the currency in which transports are accounted coincides again with the currency of the stored credit. Since the currency of the stored credit remains constant, no losses of the credit will happen due to unfavourable rates of exchange on return to the original currency zone.

Furthermore, in the first embodiment of the method according to the invention, credits in different currencies can be stored on the user terminal. Thus, for example a credit in EURO can be charged in Germany and a credit in Danish crowns can be charged in Denmark. Depending on the place where the user terminal will then be used, a conversion of one or both credits using the corresponding conversion factor(s) into the currency that is valid in the respective currency zone will then be realised, which currency will be shown on the display of the user terminal.

In another embodiment of the method according to the invention, a credit on an account that is established with the method provider is allocated to a user terminal via an identification of the user terminal. For the use of a means of transport a user has to check in with his user terminal at a check-in device, wherein the user terminal transmits the user terminal identification that is unequivocally allocated to it to the check-in device. Due to this check-in operation a background system is informed about the fact that now a means of transport is used using the user terminal identified by means of the user terminal identification. As soon as the user then leaves the means of transport, he will check out with his user terminal at a corresponding check-out device, wherein the user terminal identification will be again transmitted from the user terminal to the check-out device. By means of the places at which the check-in and the check-out operations have been realised, the distance can be determined that has been traveled by the user or the user terminal, whereupon the fare can be determined and deducted from the credit stored on the account that is allocated to the user terminal.

According to the invention, it is verified during the check-in operation whether the currency in which the use of the corresponding means of transport will be accounted corresponds to the currency in which the credit has been stored on the account that is allocated to the user terminal. If this is the case, no conversion of the currency will be required. Alternatively, the conversion factor can also be set to "1". If however the currencies are different, a conversion factor will be determined, as in the first embodiment, that will be valid as long as the user is in the corresponding currency zone.

For rides in different currency zones, particular regulations can be determined. Rides in different currency zones can be for example considered as two partial rides, but this shall not be explained in further detail here.

It is to be understood that the embodiments described above are not limiting. Modifications and variations are rather possible without departing from the scope of protection of the present invention that is defined by the annexed claims.

The invention claimed is:

1. A method for calculation of a fare for the use of a transport means, the method comprising the steps of:
   providing a transmitter in the transport means;
   providing a receiver in a user terminal of a user, the user terminal including a memory;
   charging the memory with a credit in a first currency that is valid in a first currency zone, wherein the credit serves for automatic deduction of the fare in case of a use of the transport means by the user;
   emitting data telegrams from the transmitter, the data telegrams containing currency information;
   receiving the data telegrams with said receiver of said user terminal;
   determining if the user terminal is in the first currency zone or a second currency zone based on the emitted data telegrams;
   determining automatically a conversion factor contained in the currency information for converting the first currency into a second currency that is valid in the second currency zone when the user terminal is in use in the second currency zone;
   calculating automatically the fare in the first currency, if the user terminal is in use in the first currency zone, or, if the user terminal is in use in the second currency zone, calculating automatically the fare in the second currency and converting it into the first currency by use of the conversion factor; and
   deducting the fare in the first currency from the credit stored in the first currency so as to maintain the stored credit in the first currency and not entirely converting it into the second currency.

2. The method according to claim 1, wherein the conversion factor remains constant during a pre-determined period of time and/or until a pre-determined event happens.

3. The method according to claim 1, wherein the credit is displayed in the currency of the currency zone in which the user terminal is used.

4. The method according to claim 1, wherein the fare is determined by a processing unit integrated in the user terminal.

5. The method according to claim 1, wherein the credit is stored in the currency that is valid in the currency zone in which it has been charged.

6. The method according to claim 1, wherein several credits in several different currencies can be allocated to a user terminal.

7. The method according to claim 6, wherein credits are preferably used up that have been charged in the currency zone in which the user terminal is actually being used.

8. The method according to claim 6, wherein the total credit is displayed in the currency that is valid in the currency zone in which the user terminal is actually being used.

9. The method according to claim 7, wherein the total credit is displayed in the currency that is valid in the currency zone in which the user terminal is actually being used.

10. A method for calculation of a fare for the use of a transport means, the method comprising the steps of:
    providing a transmitter being arranged in or near the transport means, the transmitter operable to transmit to a receiver in a device, the device being charged with a credit in a first currency that is valid in a first currency zone, wherein a fare may be automatically deducted from the credit when the transport means are used;
    emitting data telegrams from the transmitter for reception by the receiver, the data telegrams containing information and a conversion factor for converting the first currency into a second currency that is valid in a second currency zone when the device is in use in the second currency zone; and
    determining if the device is in the first currency zone or the second currency zone based on the emitted data telegrams, wherein the data telegrams enable the device to calculate the fare in the first currency if the device is in use in the first currency zone, or, calculate the fare in the second currency if the device is in use in the second currency zone and convert it into the first currency with the conversion factor, and wherein the device can deduct the fare in the first currency from the credit stored in the first currency so as to maintain the stored credit in the first currency and not entirely converting it into the second currency.

* * * * *